United States Patent
Nakamura

(10) Patent No.: US 8,027,408 B2
(45) Date of Patent: Sep. 27, 2011

(54) ASK MODULATOR

(75) Inventor: Takashi Nakamura, Tokyo (JP)

(73) Assignee: Oki Semiconductor Co., Ltd., Tokyo (JP)

( * ) Notice: Subject to any disclaimer, the term of this patent is extended or adjusted under 35 U.S.C. 154(b) by 839 days.

(21) Appl. No.: 11/962,141

(22) Filed: Dec. 21, 2007

(65) Prior Publication Data

US 2009/0161785 A1  Jun. 25, 2009

(51) Int. Cl.
*H03C 1/52* (2006.01)
(52) U.S. Cl. .......... 375/300; 341/70; 375/282; 375/333; 375/361; 708/704
(58) Field of Classification Search .................. None
See application file for complete search history.

(56) References Cited

FOREIGN PATENT DOCUMENTS

| JP | 5-136828 | 6/1993 |
| JP | 2000-307664 | 11/2000 |

OTHER PUBLICATIONS

Pan et. al.; Performance Analysis of Preclipping AM/QAM Hybrid Lightwave Systems; Journal of Lightwave Technology, vol. 15, No. 1, Jan. 1997; pp. 1-5.*

* cited by examiner

*Primary Examiner* — Dac Ha
*Assistant Examiner* — Adolf Dsouza
(74) *Attorney, Agent, or Firm* — Volentine & Whitt, PLLC

(57) ABSTRACT

An ASK modulator for reducing the difference in the On/Off ratio due to the difference in the envelope frequency components without deteriorating an adjacent wave leakage power is disclosed. The ASK modulator includes a Manchester encoder that generates Manchester-encoded signals by applying Manchester encoding to an input signal sequence, a waveform shaping unit that generates band-limited encoded signals from the Manchester-encoded signals, and detects and limits minimum values of waveforms of the band-limited encoded signals to generates shaped signals, and a modulating unit that modulates carrier waves based on the shaped signals.

1 Claim, 16 Drawing Sheets

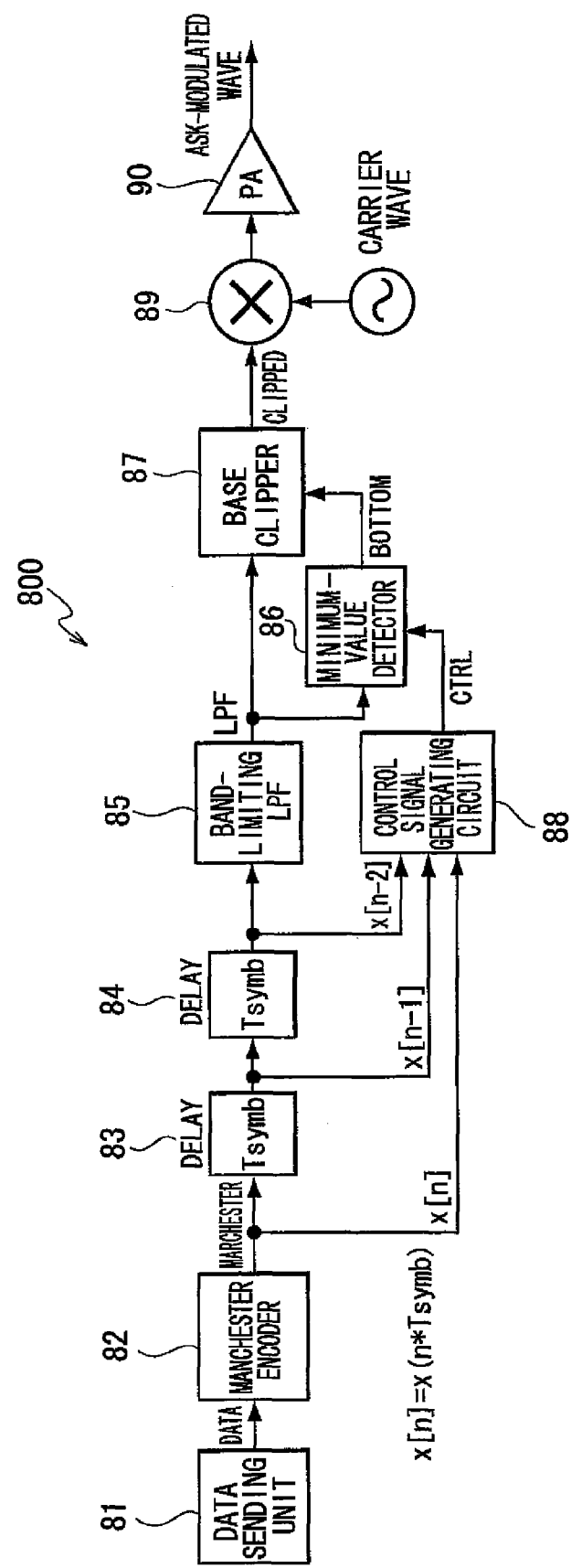

ASK MODULATOR

BACKGROUND OF THE INVENTION

1. Field of the Invention

The present invention relates to an ASK modulator, ASK modulators being utilized in such applications as car-mounted units and road-side radio units.

2. Description of the Related Art

Increasingly ASK (Amplitude-Shift Keying) modulations are being used centrally for narrow-band communications or for extremely short-range communications, such as in ETC (Electronic Toll Collection), keyless entry or RFID (Radio Frequency IDentification) tag systems. The advantage of ASK modulation is that the configurations of modulation/demodulation circuits can be made simple.

ASK modulations are a type of digital modulation system, so their signal waves are square waves. When carrier waves are directly modulated with square waves, the band of the carrier widens and this does not satisfy standards for adjacent wave leakage power and occupied band width. In order to confine the adjacent wave leakage power and the occupied band width to within the standard values, it is necessary to band-limit digital data.

To limit the bands of the digital data in ASK modulations, there is a method (as referred to in Japanese Patent Application Laid-open (JP-A) No. 2000-307664) using an analog LPF (Low-Pass Filter) and there is a method (as referred to in JP-A No. H5-136828) using a digital filter.

FIG. 14 shows an example of a conventional ASK modulator. FIG. 15 shows waveforms of the individual portions of FIG. 14. FIG. 15 shows the waveforms when the sending bit rate for sending binary data is 1,024 Kbps, and the sending data, from a data sending unit 51 shown in FIG. 14, is indicated by "DATA". When this binary sending data is to be sent, Manchester-encoding is performed such that the sending data is changed at the center of a sending bit from "1" to "0" when a sending bit is "1", and such that the sending data is changed in the opposite direction from "0" to "1" when a sending bit is "0". By performing this Manchester-encoding in a Manchester encoder 52, the pulse change always occurs at the center of the bits so that synchronization can be easily made at the receiving side. If this Manchester-encoding is performed, two symbols are sent for a single bit time period. If the single bit time period is Tbit, one symbol time Tsymb is expressed by Tsymb=Tbit/2. The waveform, which is prepared by applying the Manchester-encoding to the waveform shown by "DATA", is shown as "MANCHESTER" in FIG. 15. If the carrier waves are subjected to ASK modulations with this Manchester-encoded waveforms, side lobes of high energy are widely distributed, as shown by the frequency spectrum of FIG. 16. If such ASK-modulated waves are sent as they are as electric waves, they cause serious radio interferences in the near-by bands. Therefore, carrier waves which are ASK-modulated by Manchester-encoded signals are subjected to band-limitation in an LPF 53 in FIG. 14. FIG. 17 shows the frequency spectrum of the ASK-modulated waves of the band-limited signal. The ratio between the power within a bandwidth of 4.4 MHz at the center frequency and the power within 4.4 MHz at the frequency spaced by 5 MHz from the center frequency is the adjacent wave leakage power ratio, and is used as an index for measuring the energy of the side lobes.

Regarding the spectrum of FIG. 16, the adjacent wave leakage power ratio is about 16 dB. Regarding the spectrum of FIG. 17, however, the adjacent wave leakage power ratio is 38 dB. It is found that the energy of the side lobes is sufficiently lower than that of the frequency spectrum of FIG. 16.

In the DSRC (Dedicated Short-Range Communication System) and the like, it is necessary to implement a complicated modulation method such as QPSK (Quadrature Phase Shift Keying) modulation as well as the ASK modulation, thus band-limitation using a digital filter becomes the standard method. In a circuit for limiting the band with a digital filter, the response of the band-limiting filter is calculated in advance according to an input digital data sequence and is stored in a ROM. Then, a response is read out on the basis of the input digital data and is subjected to D/A conversion, so that a band-limited signal is generated. A band-limited signal generating circuit according to a stored waveform reading method is disclosed in JP-A No. H5-136828. FIG. 4 is a block diagram of a conventional band-limiting signal circuit, and FIG. 5 presents waveform diagrams of the individual portions of FIG. 4. In this example, a transient response of the signal caused by band-limitation extends over five bits. Thus, input serial data is stored in units of five bits. Each bit of the data "11010" is individually stored in five data registers #1 to #5 in a register 40 shown in FIG. 4. The data bit shifts in the data register 40 at a timing of a waveform "g", which is a data clock waveform, shown in FIG. 5. Waveforms "a" to "e" are element waveforms of the individual bit units. The waveform "a" indicates the signal waveform of the data to be stored in the data register #1. Likewise: the waveform "b" indicates that of the data register #2; the waveform "c" indicates that of the data register #3; the waveform "d" indicates that of the data register #4; and the waveform "e" indicates that of the data register #5. In a ROM 41, a waveform, which is the additions of waveforms "a" to "e" at the position of the register #3, is stored in advance. The waveform stored in the ROM 41 is outputted as a band-limited output waveform data at a timing of a ROM clock waveform "f", where the time period thereof corresponds to one-eighth of the time period of the waveform "g".

When such an ASK-modulated signal is demodulated, a demodulator shown in FIG. 6 is used. In FIG. 6, the ASK-modulated waves are converted by a logarithmic envelope detector (LOG ENVELOPE DETECTOR) 60 into waveforms proportional to the logarithmic values of the envelopes of the modulated waves. These logarithmic envelope signals are averaged by an LPF 61 to create a slice level, and the slice level and the logarithmic envelope signal are compared in a comparator 62, to thereby demodulate the sent Manchester-encoded signals. The optimum slice level has an intermediate value between a High level and a Low level of the logarithmic envelope signal.

When the sending bit is consecutive "1"s, as described above, the Manchester-encoded signal changes with a time period one half of that of the Tbit. When the sending bit is a repetition of "0101", the Manchester-encoded signal changes with a time period of Tbit. Thus, in the Manchester-encoded signal, signal sections of changes at one half of Tbit and signal sections of changes at Tbit are mixed. Therefore the Manchester-encoded signal is subjected to band-limitation at the LPF 53 of FIG. 14 so that the signal sections of changes at one half of Tbit have a smaller amplitude than that of the signal sections of changes at Tbit. Moreover, the On/Off ratio of the ASK-modulated waves, logarithmically measured, i.e., in decibels, is large for the signal sections of changes at Tbit, but small for the signal sections of changes at one half of Tbit. FIG. 7A shows the logarithmic envelope of the modulated output by the conventional ASK modulator. In FIG. 7A, the Low level of the signal sections for changes at Tbit is far lower than the Low level of the signal sections for changes at one half of Tbit. As a result, it is difficult to maintain the optimum slice level on the receiving side. If the Low level portion of the logarithmic envelope continues and if this continuous Low level portion is lower than the discontinuous isolated Low level portion, as shown by the slice level waveform in FIG. 6, the slice level deviates from the optimum slice level and this causes erroneous demodulation.

Here, if the difference in the On/Off ratio of the ASK-modulated waves between the signal section for the change of Tbit and the signal section for the change of one half of Tbit is reduced, the deviation from the optimum slice level in the receiving side is reduced. For example, there is a method for increasing the cut-off frequency of the band-limiting LPF 53 in FIG. 14 thereby to increase the On/Off ratio of the ASK-modulated waves in the signal section of the change for one half of Tbit. FIG. 18 shows the logarithmic envelope signal of ASK-modulated waves when the cut-off frequency of the band-limiting LPF 53 is increased. FIG. 19 shows the frequency spectrum of this case. In FIG. 18, as compared with FIG. 7A, the difference in the Low level between the signal sections of the changes at Tbit and the signal sections of the changes at one half of Tbit substantially disappears. In FIG. 19, however, the adjacent wave leakage power ratio is 28 dB and this is worse by 10 dB than that shown in FIG. 17.

In addition to the increase of the cut-off frequency of the band-limiting LPF 53 in FIG. 14, when the depth of modulation of the carrier waves in mixer 54 is lowered, the On/Off ratio of the ASK-modulated waves at the output of the mixer 54 is reduced. In this case, the deterioration of the adjacent wave leakage power ratio, due to the nonlinearity of a power amplifier 55 which comes after the mixer 54, is suppressed. However, the adjacent wave leakage power ratio to be inputted to the mixer 54 deteriorates, and hence the adjacent wave leakage power ratio of the output of the power amplifier 55 is not improved much, despite sacrificing the reduction of the On/Off ratio of the ASK-modulated waves.

The present invention is to solve the aforementioned problems, and it is an object of the present invention is, without introducing the deterioration of an adjacent wave leakage power, to realize an ASK modulator in which the difference between the On/Off ratio of the low envelope frequency components and the On/Off ratio of the high envelope frequency components is remarkably reduced, in order to generate easily receivable signals.

BRIEF DESCRIPTION OF THE DRAWINGS

FIG. 8 is a diagram showing an ASK modulator in a second embodiment of the invention;

SUMMARY OF THE INVENTION

The present invention has been made in view of the above circumstances and provides an ASK modulator.

An aspect of the present invention provides an ASK modulator including a Manchester encoder, a waveform shaping unit, and a modulating unit. The Manchester encoder generates Manchester-encoded signals by applying Manchester encoding to an input signal sequence. The waveform shaping unit generates band-limited encoded signals from the Manchester-encoded signals, and detects and limits minimum values of waveforms of the band-limited encoded signals to generate shaped signals. The modulating unit modulates carrier waves based on the shaped signals.

DETAILED DESCRIPTION OF THE INVENTION

First Embodiment

The present embodiment is an ASK modulator including a band-limited signal generating circuit according to a stored waveform reading method, and stores the responding waveform responding to three consecutive symbols by making use of the characteristics of a Manchester-encoded signal.

An ASK modulator is provided, in which the difference in the On/Off ratio of ASK-modulated waves is reduced by storing a time waveform corresponding to a sending data series pattern with the waveform, in which the difference in the On/Off ratio of the ASK-modulated waves is eliminated in advance, and by reading out the stored waveforms in accordance with the pattern of the sending data series.

In the Manchester-encoded signal identical codes are not consecutive over three symbols, and thus the three consecutive signals are limited to any of "001", "010", "011", "100", "101" and "110".

Among these, the Low level of the band-limited waveform to the input "100" is lower than the Low level of the band-limited waveform to the input "101". The ASK modulator of the invention modifies the Low level of the band-limited waveform to the input "100" in a manner to match the Low level of the band-limited waveform to the input "101", and stores the response data in a ROM, thereby reducing the difference in the On/Off ratio of ASK-modulated waves.

According to the invention, an easily receiving Manchester-encoding ASK modulator can be realized without introducing a deterioration of the adjacent wave leakage power.

-Structure of the ASK Modulator 100-

Figure 1:
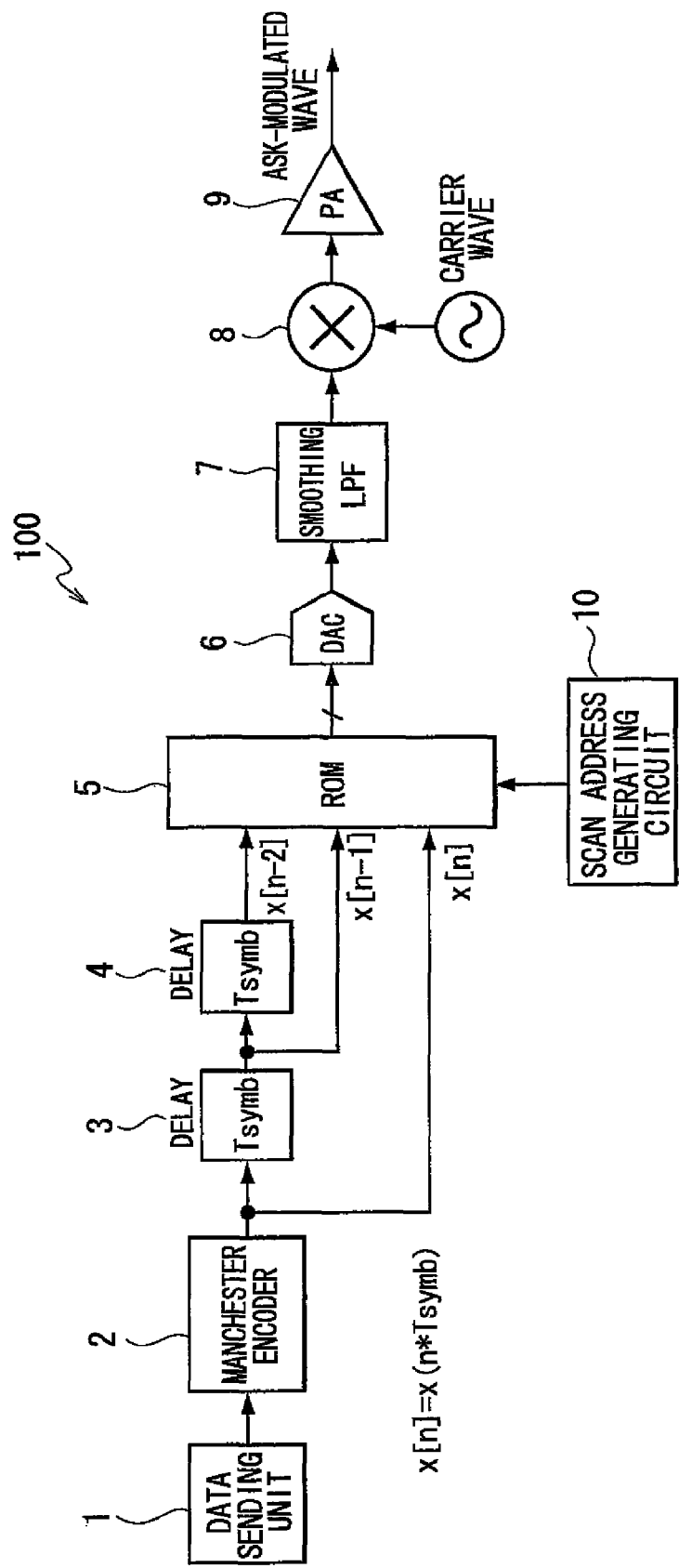
FIG. 1 is a diagram showing an ASK modulator in a first embodiment of the invention.

FIG. 1 shows an ASK modulator 100 of the present embodiment. The ASK modulator 100 includes a data sending unit 1, a Manchester encoder 2, delays 3 and 4, a ROM (Read Only Memory) 5, a DA converter (DAC) 6, a smoothing LPF (hereinafter, referred to as "LPF") 7, a mixer 8, a power amplifier (PA) 9, and a scan address generating circuit 10.

The data sending unit 1 sends input signal series to the Manchester encoder 2.

The Manchester encoder 2 performs the Manchester encoding of the received signals, and generates Manchester-encoded signals.

The delays 3 and 4 delay the Manchester-encoded signals by, respectively, one symbol.

Figure 2:
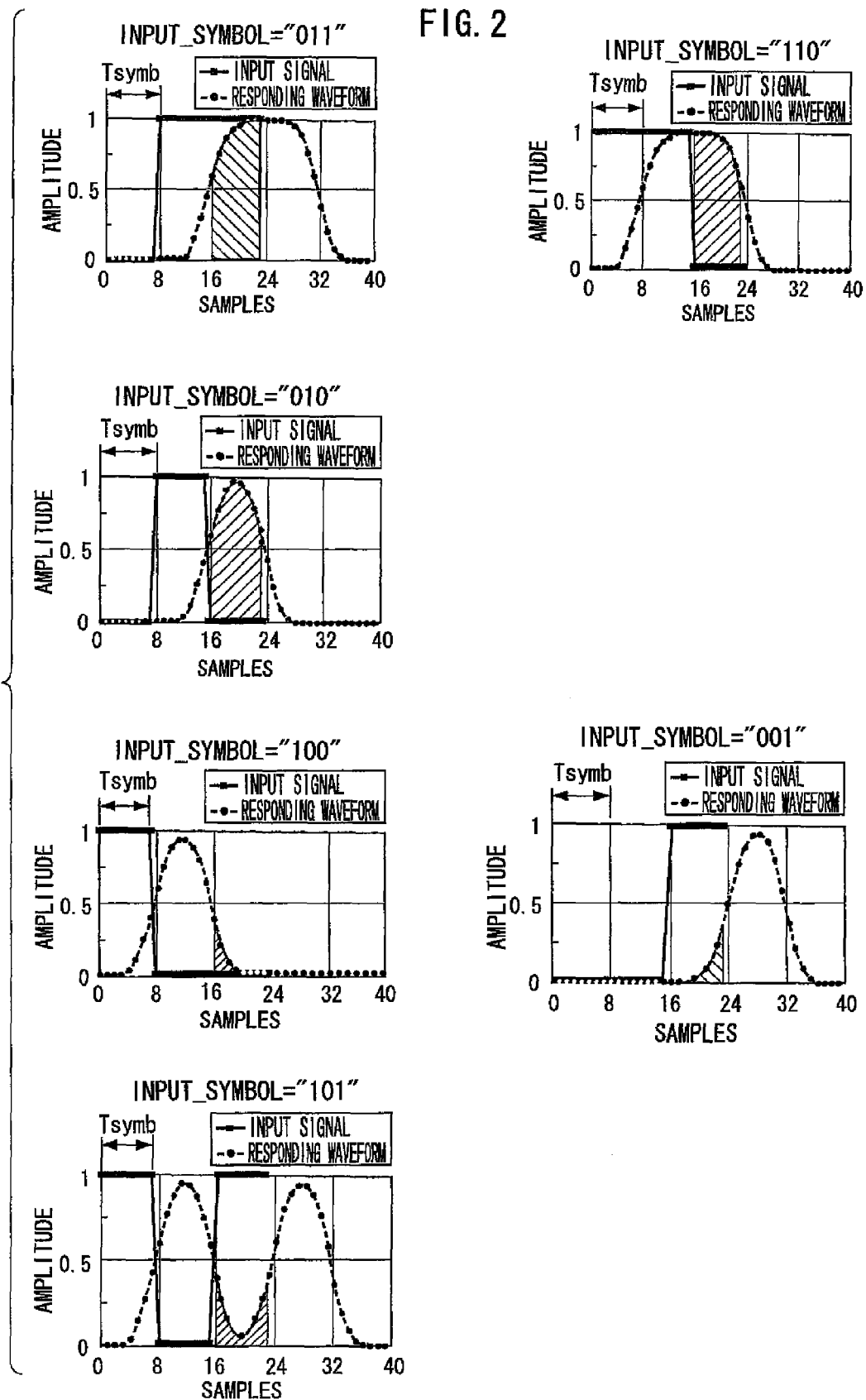
FIG. 2 presents graphs showing responding waveforms when inputs of consecutive three symbols "001", "010", "011", "100", "101" and "110" are subjected to band-limitations by an LPF.

The ROM 5 stores hatched portions of responding waveforms of the input signal series shown in FIG. 2 as digital data. FIG. 2 is explained in detail below. Here, ROM 5 is erasable and writable, such as an EPROM (Erasable Programmable Read Only Memory).

The DA converter 6 converts signals of the digital data into signals of analogue data.

The LPF 7 smoothes the analogue data.

The mixer 8 performs ASK modulation using the analogue data from the LPF 7.

The power amplifier 9 amplifies and outputs the ASK-modulated waves.

The scan address generating circuit 10 generates a scan address to read out the stored data from the ROM 5.

-Operation of the ASK Modulator 100-

When the input signal series are sent to the Manchester encoder 2 from the sending unit 1, Manchester encoding is performed to the input signal series and a Manchester-encoded signal is generated in the Manchester encoder 2. The Manchester-encoded signal is delayed by one symbol by delays 3 and 4, to thereby acquire a one-symbol delayed signal $x[n-1]$ and a two-symbol delayed signal $x[n-2]$.

Here, FIG. 2 shows the time waveforms, in which the individual input signal series "001", "010", "011", "100", "101" and "110" are subjected to band-limitation. In FIG. 2, the LPF which will be achieved has a delay time of one symbol such that the responding waveform stored in ROM 5, to which all the three consecutive symbols contribute, can be simply the hatched portions. By outputting only these hatched portions to the three consecutive symbol inputs, it becomes possible to generate a waveform in which the arbitrary Manchester-encoded signal series has been subjected to band-limitation by the ROM 5.

The ROM 5 stores as digital data only the hatched portions of the responding waveforms individually responding to the input signal series, as shown in FIG. 2. The stored data is read out according to the scan address from the scan address generating circuit 10, using the three signals $x[n-2]$, $x[n-1]$ and undelayed signal $x[n]$ as keys, then the stored data is converted into analogue data by the DA converter 6. The data is outputted from the ROM 5 at a timing of a ROM clock which has been prepared by dividing one data symbol into eight. The analogue data is smoothed by the LPF 7 and the ASK modulation is performed by the mixer 8. The ASK-modulated signal is amplified by the power amplifier 9 and then is outputted. As a result, the ASK-modulated waveforms using band-limited Manchester-encoding are generated.

Figure 3:
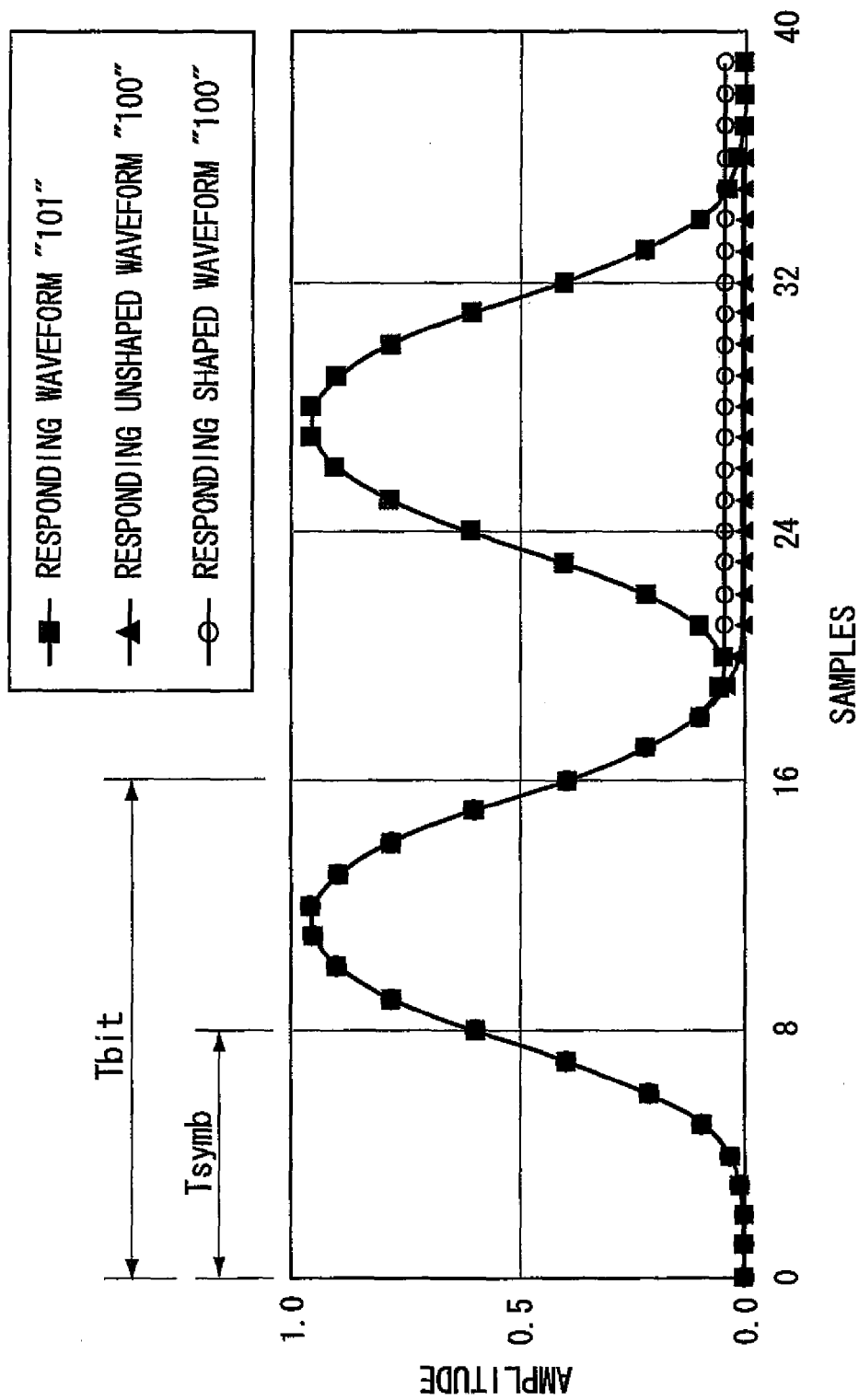
FIG. 3 presents graphs showing shaped and unshaped examples of the responding waveforms of "100"
Figure 4:
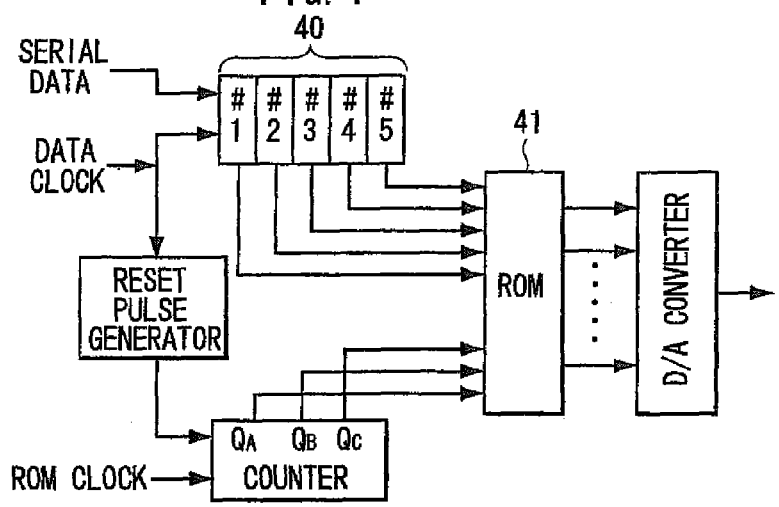
FIG. 4 is a diagram showing a conventional digital band-limited signal generating circuit.
Figure 5:
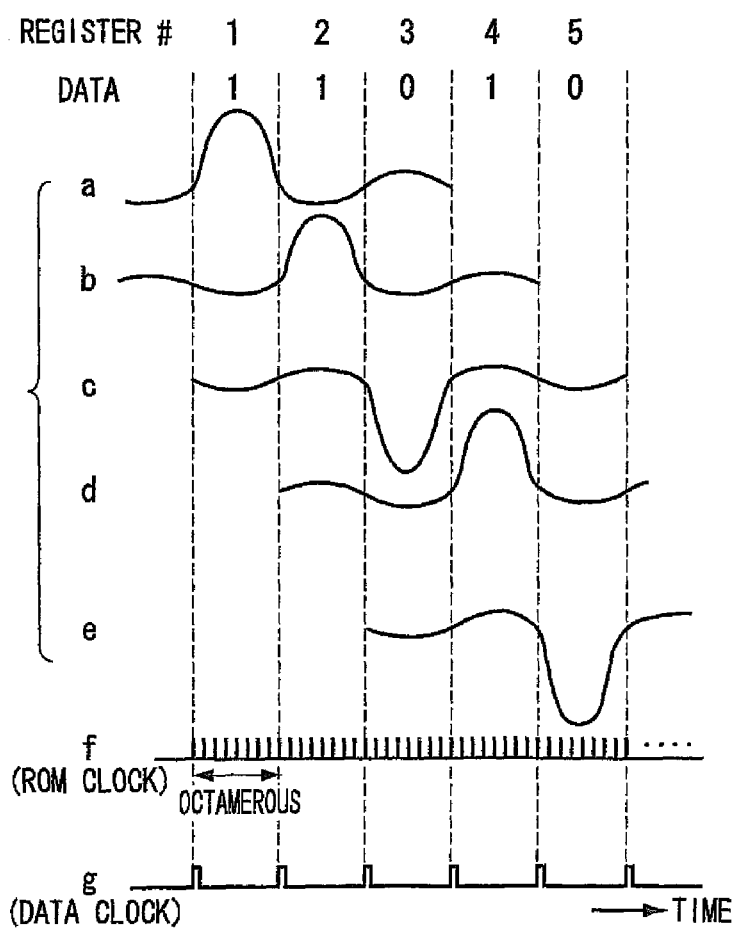
FIG. 5 is a graph showing waveforms from a conventional digital band-limited signal generating circuit.
Figure 6:
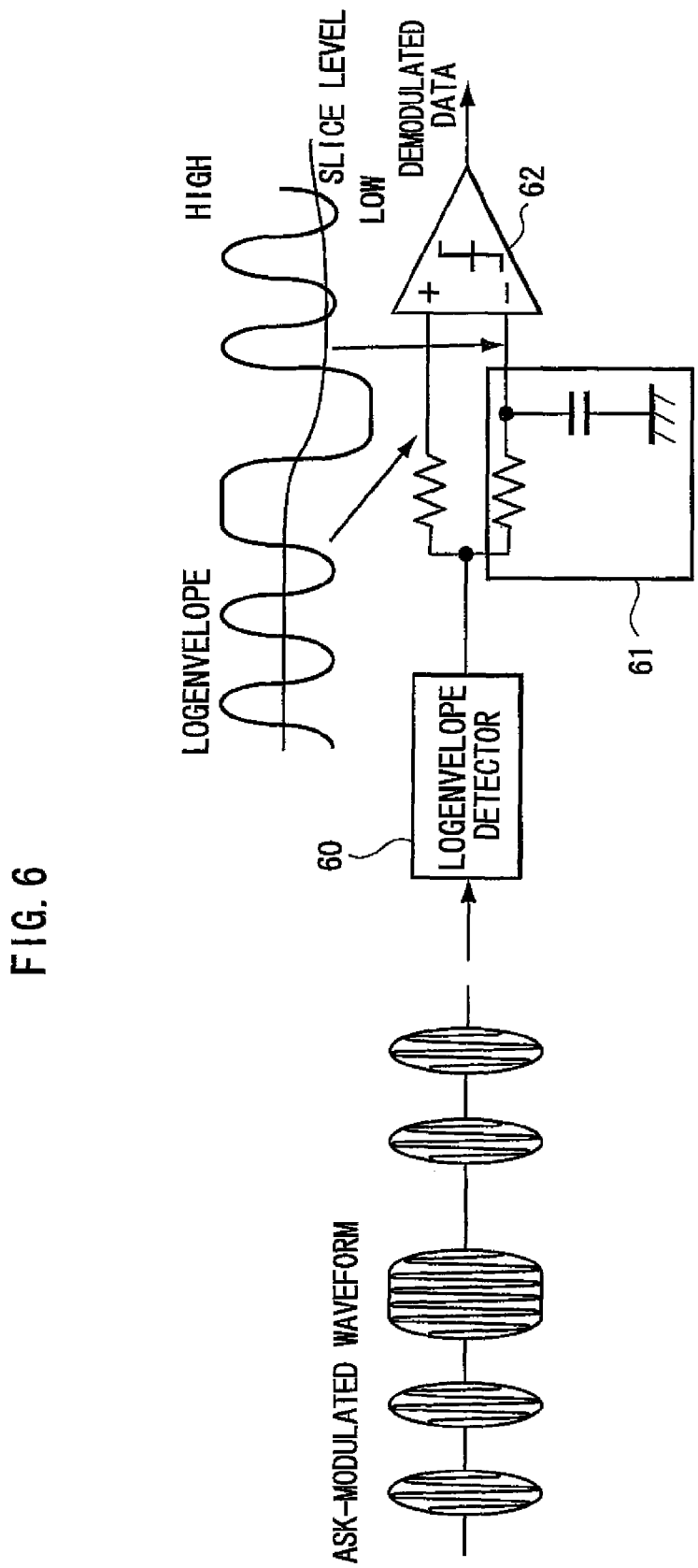
FIG. 6 is a diagram showing an ASK demodulator of the first and second embodiments of the invention.

The Low level of the band-limited waveform to the input "100" is lower than the Low level of the band-limited waveform to the input "101". The Low level of the band-limited waveform to the input "100" is limited to the same value as the Low level of the band-limited waveform to the input "101", and is stored in advance in the ROM 5. The waveform, in which the minimum value of the response of "100" is shaped, is shown in FIG. 3. By thus shaping (clipping) the responding waveform to "100" and storing it in the ROM 5, it is possible to realize an ASK modulator in which the difference in the On/Off ratio of the ASK-modulated waves is remarkably reduced.

Figure 7A:
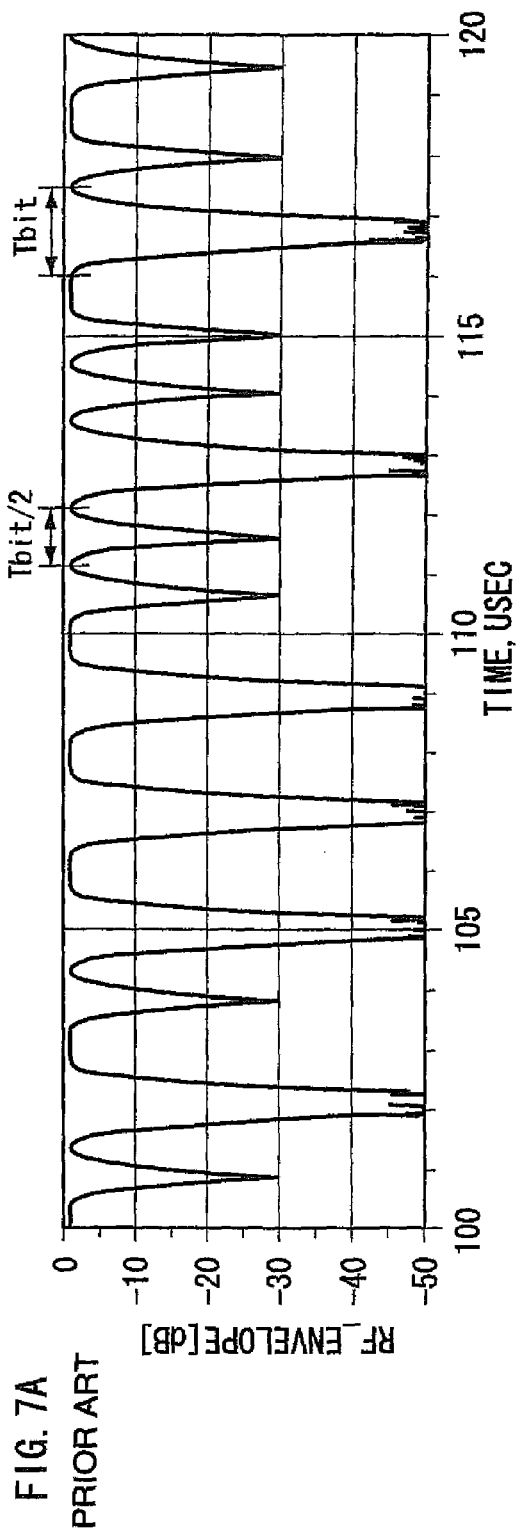
FIG. 7A is a graph showing the logarithmic display waveform of the output envelope of a conventional ASK modulator.
Figure 7B:
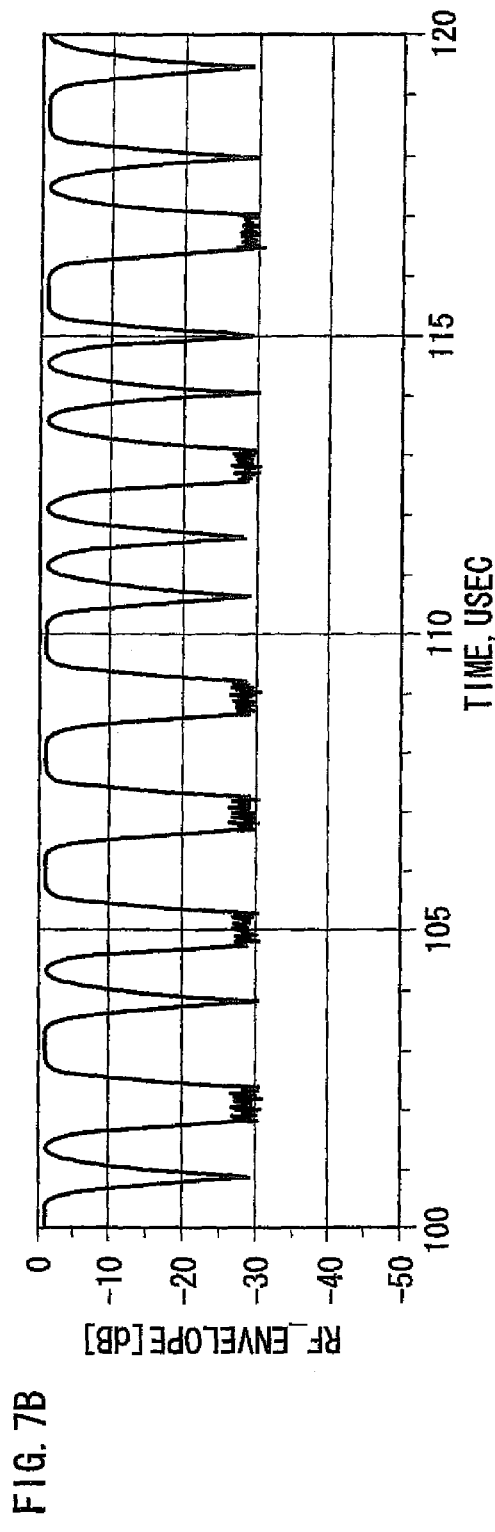
FIG. 7B is a graph showing the logarithmic display waveform of the output envelope of the ASK modulator of the first and second embodiments of the invention.
Figure 13:
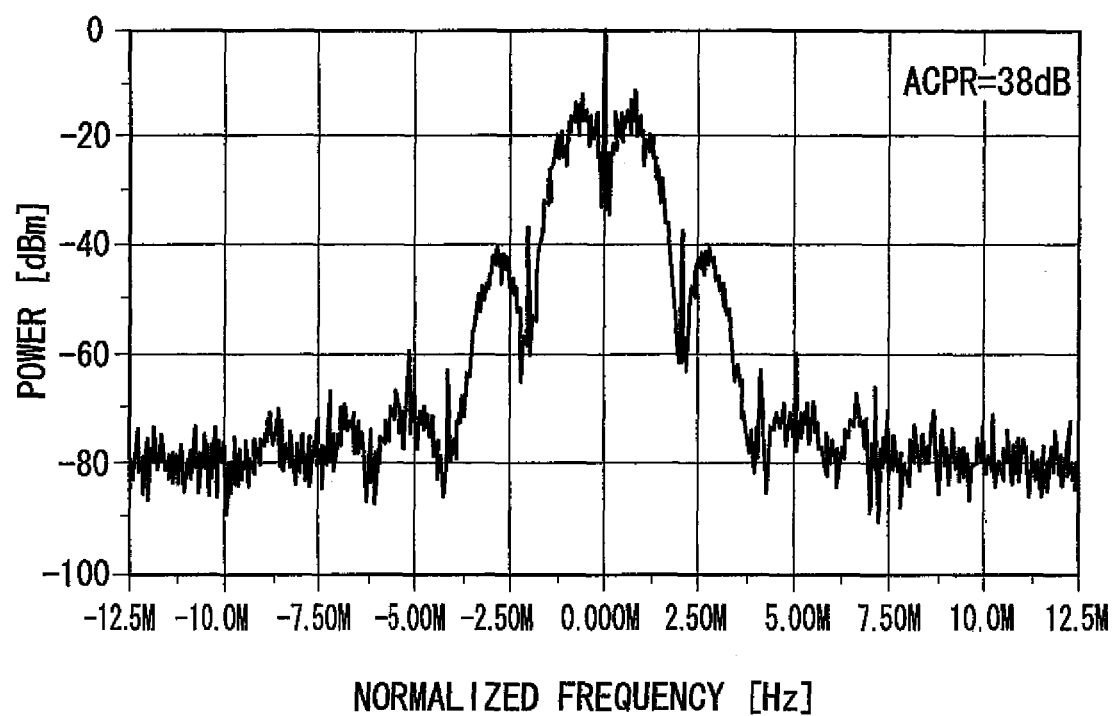
FIG. 13 is a graph showing an output spectrum of the ASK modulator of the first and second embodiments of the invention.
Figure 14:
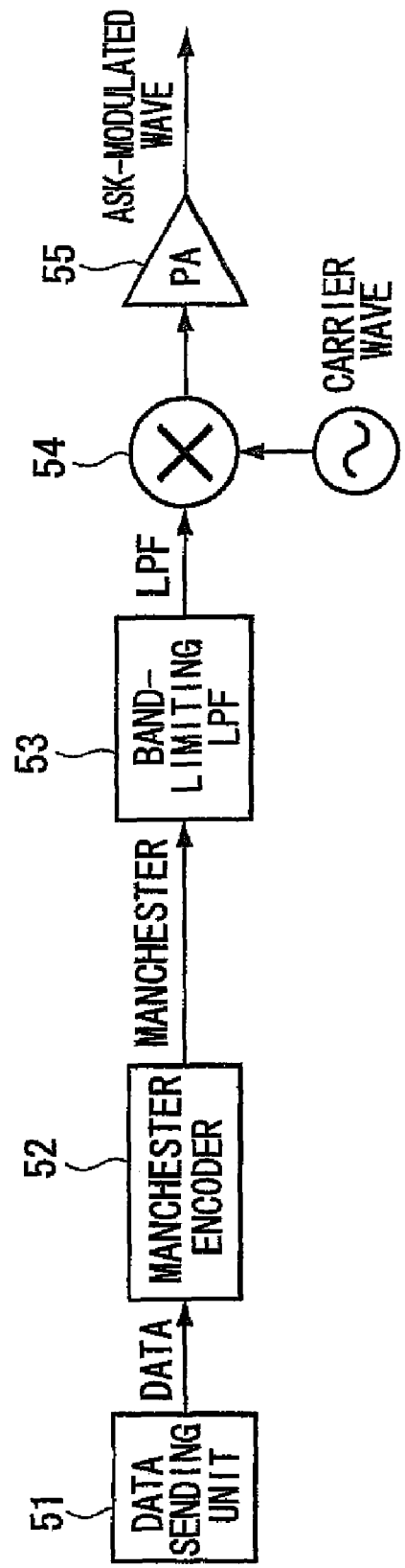
FIG. 14 is a diagram showing a conventional ASK modulator.
Figure 15:
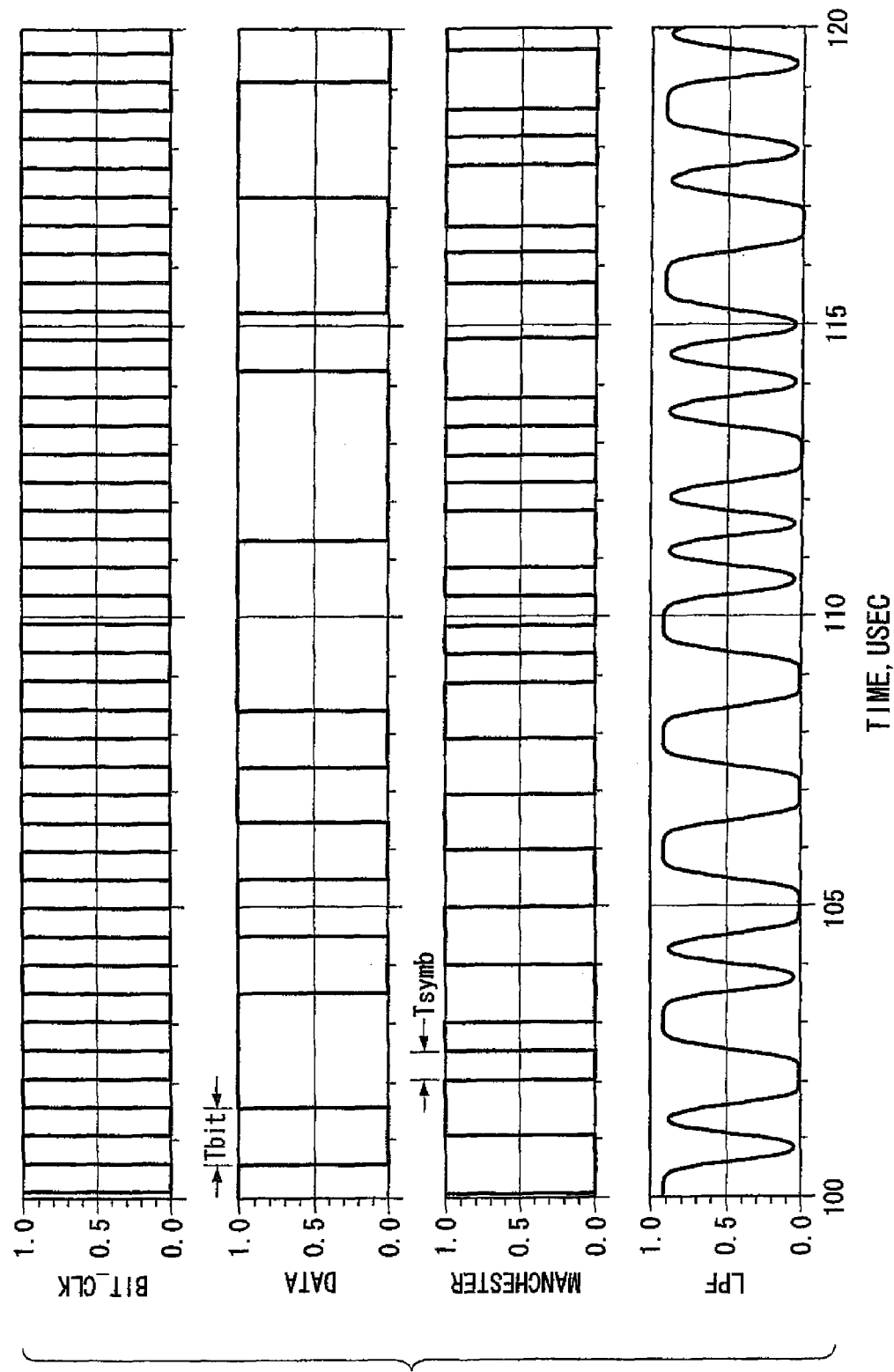
FIG. 15 presents graphs showing the time waveforms of the individual portions of the conventional ASK modulator.
Figure 16:
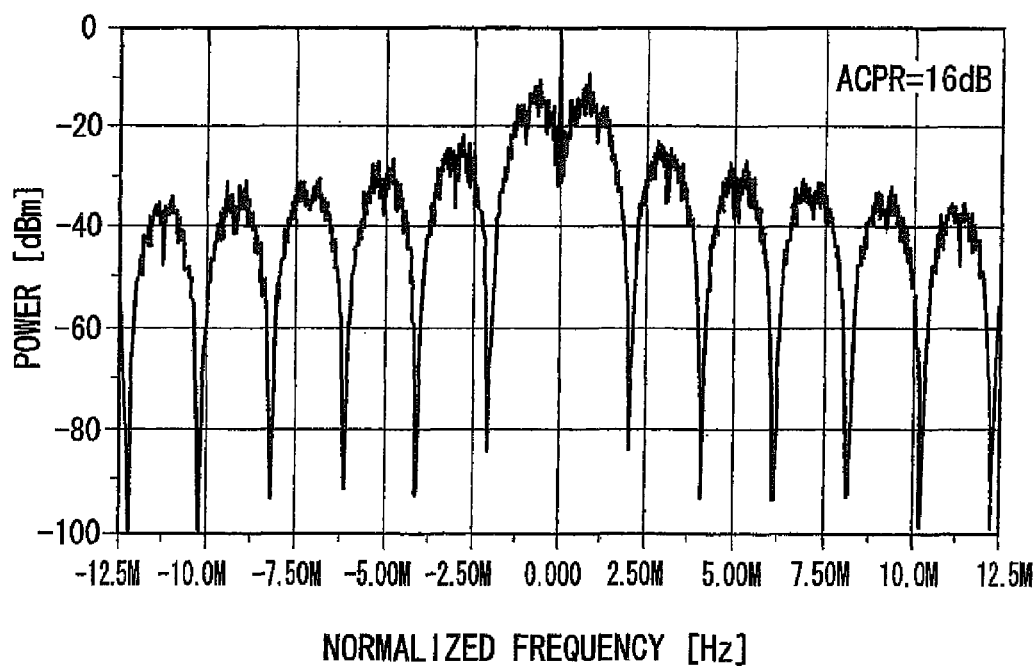
FIG. 16 is a graph showing a modulated spectrum in a band-unlimited signal.
Figure 17:
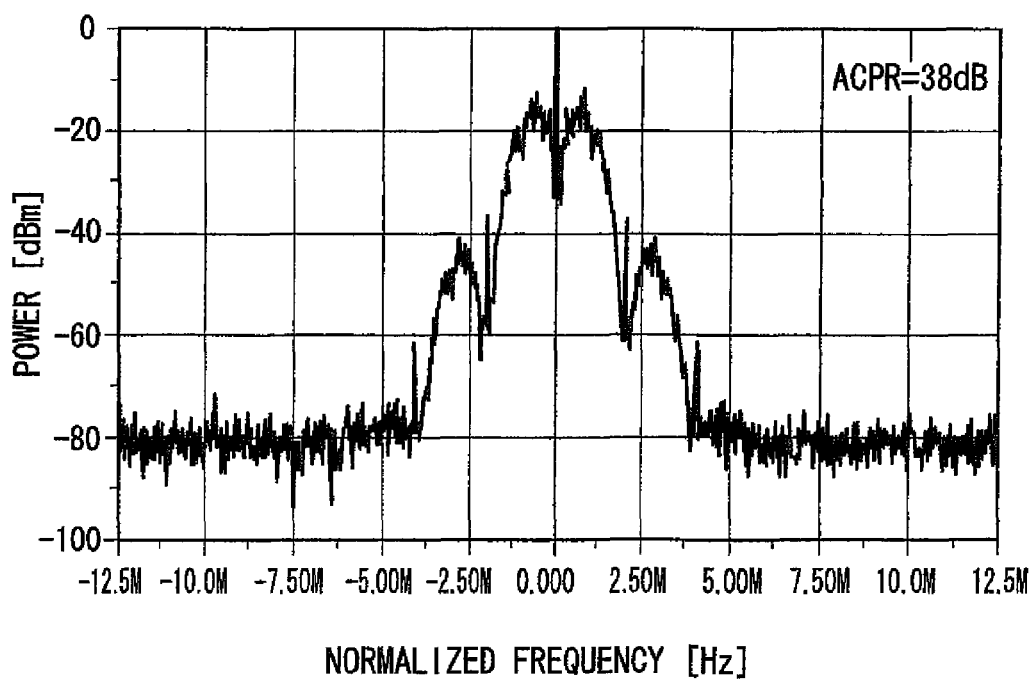
FIG. 17 is a graph showing an output spectrum of the conventional ASK modulator.
Figure 18:
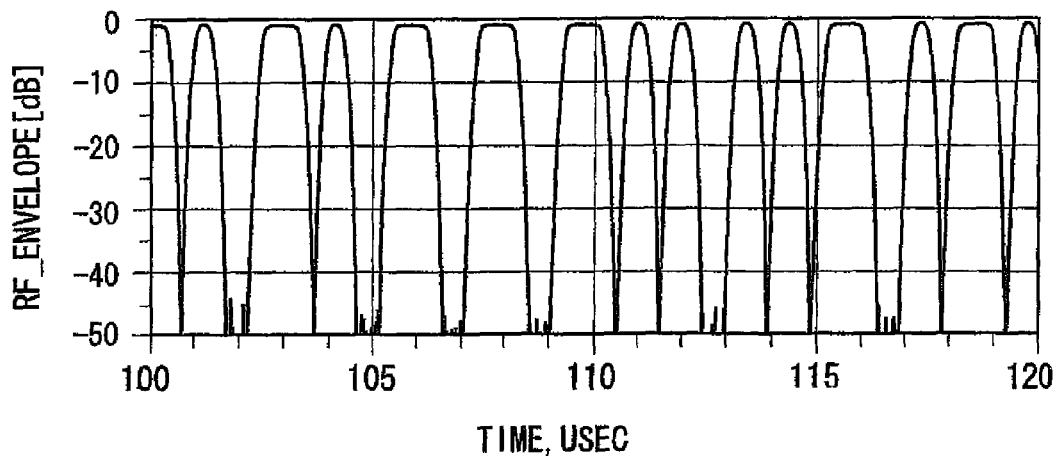
FIG. 18 is a graph showing the logarithmic display waveform of the output envelope when the cut-off frequency of the band-limiting LPF is increased in the conventional ASK modulator.
Figure 19:
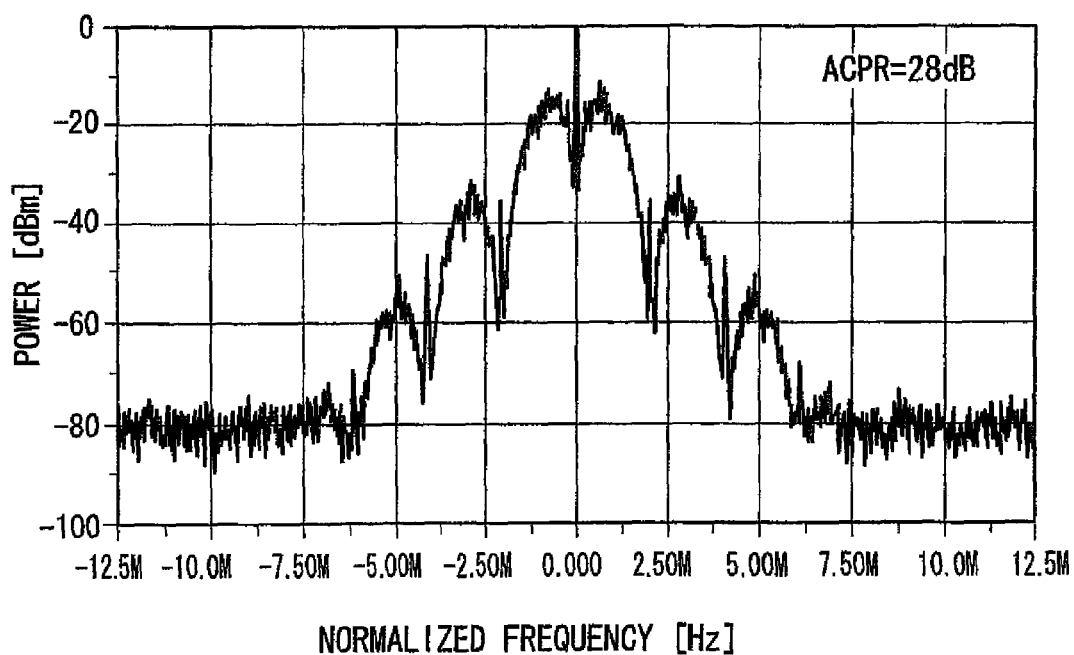
FIG. 19 is a graph showing the output spectrum when the cut-off frequency of the band-limiting LPF is increased in the conventional ASK modulator.

FIG. 7B shows the output envelope when the carriers are ASK-modulated with the clipped waveform. According to this embodiment, as seen from FIG. 7B, it is possible to remarkably reduce the difference between the On/Off ratios of the ASK-modulated waves. FIG. 13 shows an output spectrum. The adjacent wave leakage power of this case is 38 dB, which is as same as the value shown in FIG. 17. Here, the adjacent wave leakage power is not deteriorated even with the extremely small difference between the On/Off ratios of the ASK-modulated waves.

Although the minimum value of the band-limited waveform is clipped, the adjacent wave leakage power and the occupied band width are almost unchanged. By thus clipping the minimum value, a crest factor of the carrier is somewhat reduced, so as to suppress the adjacent wave leakage power ratio deterioration due to the nonlinear distortion of a power amplifier 9 in FIG. 1.

When the carrier frequency is high, the On/Off ratio of the ASK-modulated waves is easily deteriorated. In the invention, however, the On/Off ratio of the ASK-modulated waves is improved by deepening the depth of ASK modulation in a mixer 8. The adjacent wave leakage power ratio to be inputted to the mixer 8 is not deteriorated so that the leakage power ratio is not seriously deteriorated even if the On/Off ratio of the ASK-modulated waves is improved.

Table 1 shows the adjacent wave leakage power ratios in the power amplifier 9 and the On/Off ratios of the ASK-modulated waves when the depth of modulations are changed in the mixer 8.

TABLE 1

| | Depth of Modulation in Mixer 8 | | | | |
|---|---|---|---|---|---|
| | −2 | −1 | 0 | 1 | 2 |
| Peak Envelope Power [dBm] | −4.15 | −4.08 | −4.02 | −3.95 | −3.86 |
| ACPR [dB] | 38.82 | 38.12 | 38.29 | 38.34 | 38.60 |
| On/Off Ratio 512K [dB] | 29.36 | 26.95 | 25.76 | 24.33 | 23.57 |
| On/Off Ratio 1,024K [dB] | 29.46 | 27.03 | 25.70 | 24.27 | 23.51 |

In Table 1, the depth of modulation of the mixer 8 is expressed by relative scale values, which have deeper modulations on a minus side and shallower modulations on a plus side with respect to 0. Table 1 shows examples when the binary sending data have a sending bit rate of 1,024 Kbps. By the Manchester-encoding, components of 512 KHz and components of 1,024 KHz are mixed in the envelope signal of the power amplifier 9. The "ACPR" designates an adjacent wave leakage power ratio, which is defined as the ratio between the electric power within the band width of 4.4 MHz at the center frequency and the power within the band width of 4.4 MHz in the frequency apart of 5 MHz from the center frequency.

As seen from Table 1, the adjacent wave leakage power ratio is hardly deteriorated, even if the On/Off ratio of the ASK-modulated waves is increased by deepening the depth of ASK modulation in the mixer 8.

According to the present invention, the adjacent wave leakage power ratio of the output of the mixer 8 is not deteriorated, because the adjacent wave leakage power ratio to be inputted to the mixer 8 is not changed, and because the margin of over modulation is larger than that of the conventional example even if the depth of ASK modulation in the mixer 8 is deepened. This is because the crest factor of the modulated waves is smaller than that of the conventional example so that the deterioration is suppressed of the adjacent wave leakage power ratio due to the nonlinear distortion of the power amplifier 9. The depth of ASK modulation in the mixer 8 is realized by adjusting the output DC offset of the D/A converter 6, so that the adjustment of the depth of ASK modulation in the mixer 8 is sufficiently flexible and stable.

In the present invention, moreover, the characteristics of the Manchester-encoding are utilized intensively so that the necessary capacity of the ROM 5 is small. Generally, the band-limitations are realized by the Gaussian filter characteristics so that the band-limited waveforms become symmetric, and thus the responding waveforms "001" and "100", and "011" and "110" become symmetric. As a result, the responding waveforms that actually need to be stored can be simply "011", "010", "100" and "101", so that the capacity needed for the ROM 5 can be remarkably small.

According to the present invention, as has been described above, it is possible, without introducing the deterioration of the adjacent wave leakage power, to realize the Manchester-encoded ASK modulator, in which the difference between the On/Off ratio of the low envelope frequency components and the On/Off ratio of the high envelope frequency components is remarkably reduced in order to generate easily receivable signals.

When the carrier frequency is high, the On/Off ratio of the ASK-modulated waves becomes deteriorates easily. In the invention, however, the On/Off ratio of the ASK-modulated waves is also improved by deepening the depth of ASK modulation in the mixer. The adjacent wave leakage power ratio to be inputted to the mixer is not deteriorated so that it is not seriously deteriorated even if the On/Off ratio of the ASK-modulated waves is improved.

Moreover, the ASK modulator of the invention is realized through adjustments of the band-limitation and the depth of modulation by digital signal processing, and hence the modulator hardly influenced by the unevenness of the values of elements.

Furthermore, DSRC and the like require not only ASK modulation but also the implementation of a complicated modulation, such as the QPSK modulation, and the band-liniitation using a digital filter providing a basis for the invention is a standard method used in DSRC or the like. Even when the ASK modulations are realized in the invention, therefore, it is possible to prevent the enlargement of the circuit scale.

Second Embodiment

The present embodiment shows an ASK modulator including a minimum-value detector, an operation of which being controlled in accordance with a pattern of sending data series, and the difference in the On/Off ratio of ASK-modulated waves being reduced by modulating a carrier with a waveform in which the minimum value of a sending baseband-modulated signal is limited with a signal from the minimum-value detector.

The embodiment of the present invention is described below with reference to the Figures.

-Structure of the ASK Modulator 800-

FIG. 8 shows an ASK modulator 800 of the present embodiment. The ASK modulator 800 includes a data sending unit 81, a Manchester encoder 82, delays 83 and 84, a band-limiting LPF (hereinafter, referred to as "LPF") 85, a minimum-value detector 86, a base clipper 87, a control signal generating circuit 88, a mixer 89, and a power amplifier (PA) 90.

The sending unit 81 sends input signal series to the Manchester encoder 82.

The Manchester encoder 82 performs the Manchester encoding of the received signals, and generates Manchester-encoded signals.

The delays 83 and 84 delay the Manchester-encoded signal by, respectively, one symbol.

The LPF 85 limits spectrum bands of the data signals.

The minimum-value detector 86 detects minimum values of the output waveform from the band-limiting filter 85.

The base clipper 87 applies limitations of the minimum values to the output waveform from the band-limiting filter 85 by using the minimum values detected in the minimum-value detector 86.

The control signal generating circuit 88 generates signals for controlling the minimum-value detector 86.

The mixer 89 performs the ASK modulation using the band-limited data signals.

The power amplifier 89 amplifies and outputs the ASK-modulated waves.

-Operation of the ASK Modulator 800-

When the input signal series are sent to the Manchester encoder 82 from the sending unit 81, the Manchester encoding is applied to the input signal series and the Manchester-encoded signal is generated in the Manchester encoder 82. The Manchester-encoded signals are delayed by one symbol, respectively, by delays 83 and 84 so that a one-symbol delayed signal x[n−1] and a two-symbol delayed signal x[n−2] are obtained. Not only an undelayed signal x[n] but also the delayed signals x[n−2] and x [n−1] are inputted to a control signal generating circuit 88.

Being delayed by an inherent delay of an one-symbol time period and by a delay of the band-limiting filter 85 from an instant when the signals {x[n−2], x[n−1], x[n]} become "101", the control signal generating circuit 88 outputs a High level signal, which corresponds to "1", with a duration of one or two symbols. While a control signal Ctrl is at the High level, that is "1", the minimum-value detector 86 is ON, and the minimum value of the output waveform of the band-limiting filter 85 corresponding to "101" is detected as a Bottom signal. Here, the Manchester-encoded signals do not contain three identical and consecutive signals. Therefore, by setting the continuation time period of the control signal Ctrl to one symbol or two symbols in accordance with the delay time of the band-limiting filter 85, what is detected is the minimum level corresponding to "101" but not the minimum level corresponding to "100".

Limitations to the minimum values are applied to the output of the band-limiting filter 85 at a Base Clipper Circuit 87 by using the Bottom signal detected by the minimum-value detector 86, and the minimum level of the output signals of the Base Clipper circuit 87 is limited to the minimum level corresponding to "101". The waveform, in which the carriers are ASK-modulated with the minimum-limited baseband signal, has an extremely reduced difference between the On/Off ratio of the low envelope frequency components and the On/Off ratio of the high envelope frequency components. Therefore, a Manchester-encoded ASK modulator which generates easily receivable signals is realized.

Figure 9A:
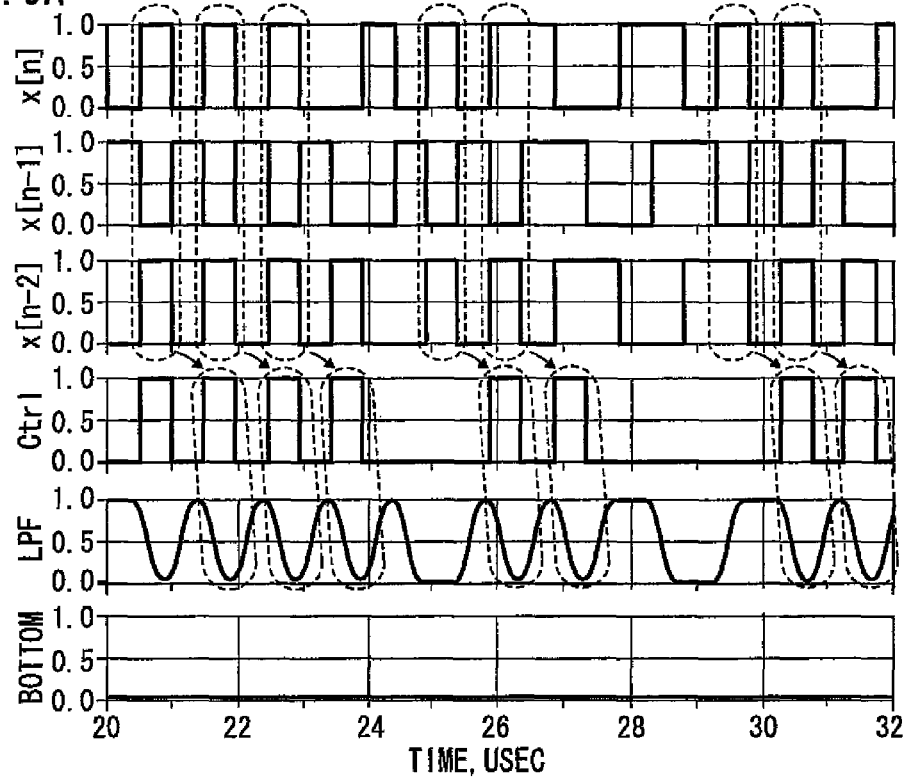
FIG. 9A presents graphs showing the time waveforms of individual portions of the ASK modulator of the second embodiment when the duration of a control signal Ctrl is one symbol.
Figure 9B:
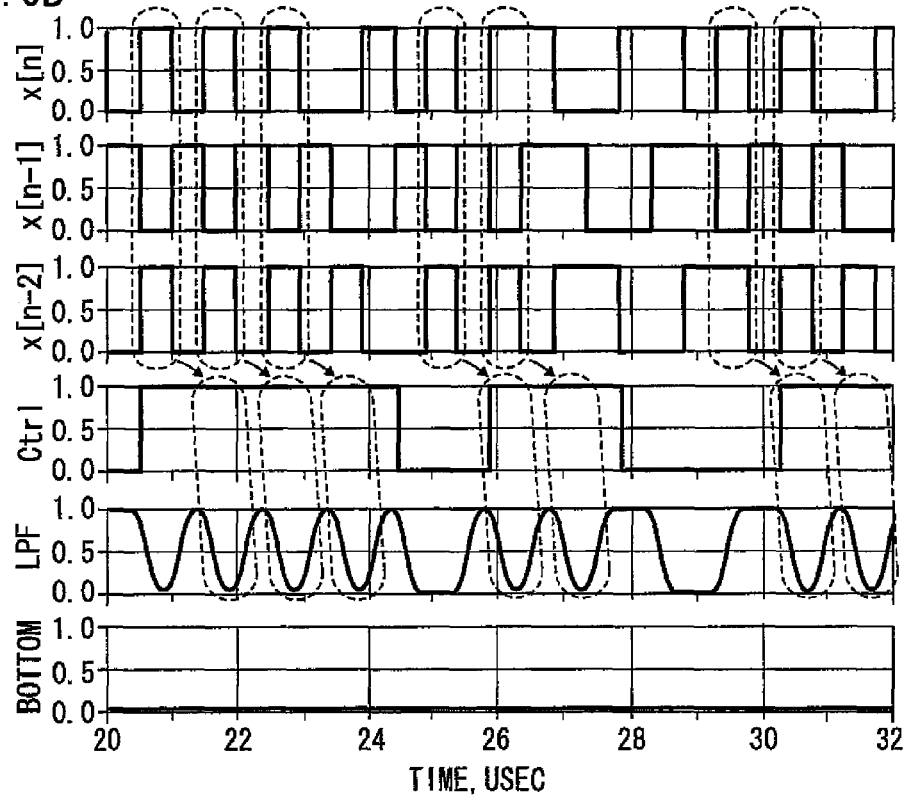
FIG. 9B presents graphs showing the time waveforms of the individual portions of the ASK modulator of the second embodiment when the duration of the control signal Ctrl is two symbols.

FIGS. 9A and 9B show the time waveforms of individual portions, when the delay time of the band-limiting filter 85 is approximately one symbol. FIG. 9A shows waveforms when the duration of the control signal Ctrl is one symbol, and FIG. 9B shows waveforms when the duration of the control signal Ctrl is two symbols. In the both cases, the minimum value of the portion corresponding to "100" is not erroneously detected, but only the minimum level corresponding to "101" is detected. Namely, the minimum-value detector 86 must detect a local minimum value, which corresponds to a response value of the input pattern of "101", but not a global minimum value. The local minimum value appears in the output of the band-limiting filter 85 with the time delay of one-symbol inherent delay and the delay of the band-limiting filter 85, after the input pattern of "101" appears. Here, the one-symbol inherent delay occurs because the local minimum value corresponds to a symbol in the middle of the consecutive three symbols.

If the operational delay of the minimum-value detector 86 can be adjustable in a short time period, the minimum-value detector 86 easily detects the local minimum value, not the global minimum value. However, the analogue ASK modulator can control only a delay of an integral multiple of the symbol time.

Figure 10:
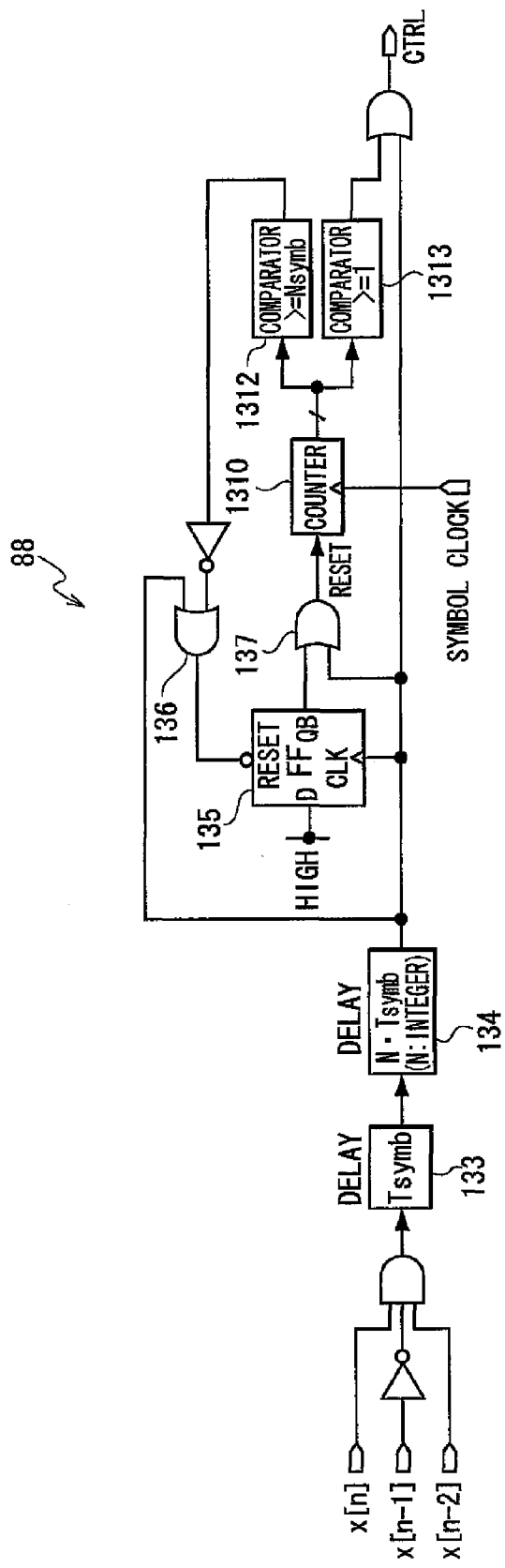
FIG. 10 is a diagram showing a control signal generating circuit in the ASK modulator of the second embodiment.

Next, an example of a configuration of the control signal generating circuit 88 is shown in FIG. 10.

In FIG. 10, a delay 133 corresponds to the above-mentioned one-symbol inherent delay. A delay 134 is a variable delay with a delay that is an integral multiple of the symbol time, and the delay is set to be the symbol delay time that is closest to the delay of the band-limiting filter 85 of FIG. 8. Being delayed by a delay of the delays 133 and 134 from an instant when $\{x[n-2], x[n-1], x[n]\}$ becomes "101", an output QB of a flip-flop 135 becomes zero. If the output of the delay 134 is 0 at that time, an OR gate 137 outputs 0, and then, a counter 1310 starts to operate based on a symbol clock. When a comparator 1313 is >=1, a Ctrl signal becomes 1. When a value of the counter 1310 is equals to or more than a value which is set in a comparator 1312, the output of an OR gate 136 becomes 0 and the flip-flop 135 is reset. As a result, the output QB becomes 1. If the output of the delay 134 is 0 in that time, an OR gate 137 outputs 1, and then the counter 1310 is reset. For example, when a comparison value Nsymb of a comparator 1312 is set to be 1, the duration of the Ctrl signal is one symbol as shown in FIG. 9A. When the comparison Nsymb is set to be 2, the duration is two symbols as shown in FIG. 9B.

Figure 11:
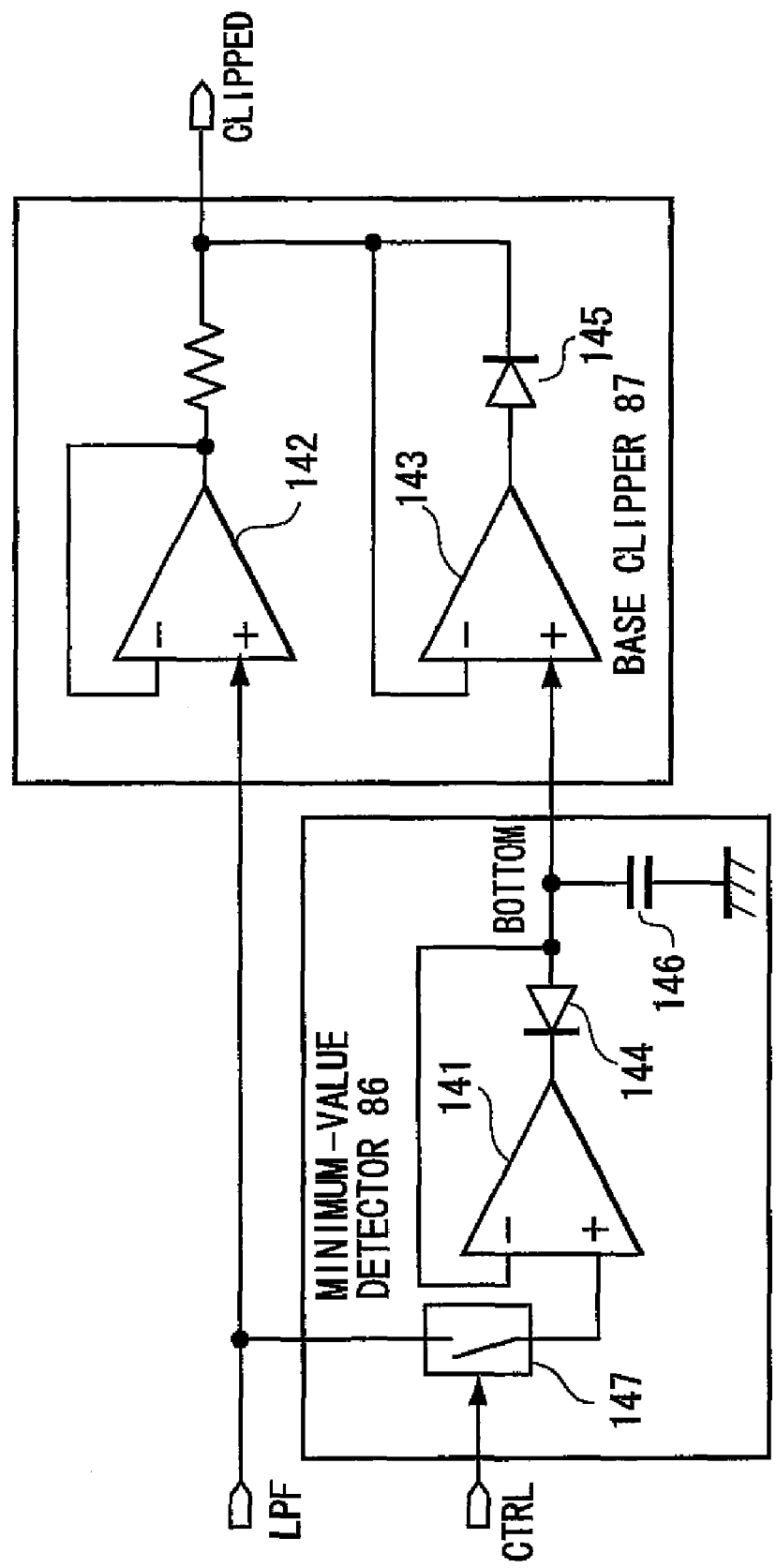
FIG. 11 is a diagram showing examples of a minimum-value detector and a Base Clipper in the ASK modulator of the second embodiment.

FIG. 11 shows examples of the configurations of the minimum-value detector 86 and the Base Clipper 87 in FIG. 8. An OP amplifier 141 and a diode 144 configure an ideal diode. An OP amplifier 143 and a diode 145 also configure an ideal diode. An OP amplifier 142 is a buffer amplifier between a LPF terminal and clipped signals. Here, a switch 147 is turned OFF when the control signal Ctrl is Low, which is "0", so that the minimum-value detector 86 does not operate. When Ctrl is High, which is "1", if the value of the LPF signal is smaller than a voltage value stored in a capacitor 146, the ideal diode configured by the OP amplifier 141 and the diode 144 is ON, and a new voltage value is stored in the capacitor 146. On the other hand, if the value of the LPF signal is greater than a voltage value stored in a capacitor 146, the ideal diode configured by the OP amplifier 141 and the diode 144 is OFF, and the voltage value of the capacitor 146 is not changed. In this way, the minimum-value detector 86 detects and stores the minimum value of the LPF terminal signal.

When the value of the LPF terminal signal is smaller than a voltage value stored in a capacitor 146, the ideal diode configured by the OP amplifier 143 and the diode 145 is ON, and then a signal of the CLIPPED terminal is equal to the voltage value stored in the capacitor 146. On the other hand, when the value of the LPF terminal signal is greater than a voltage value stored in a capacitor 146, the ideal diode configured by the OP amplifier 143 and the diode 145 is OFF, and then the voltage value of the LPF terminal signal is outputted without change from the CLIPPED terminal. In this way, the minimum-value detector 86 detects and stores the above-mentioned desired local minimum value based on the control signal Ctrl, which is generated by the control signal generating circuit 88, and using the detected local minimum value, the Base Clipper 87 performs bottom-clipping to the LPF input shown in FIG. 11.

Figure 12A:
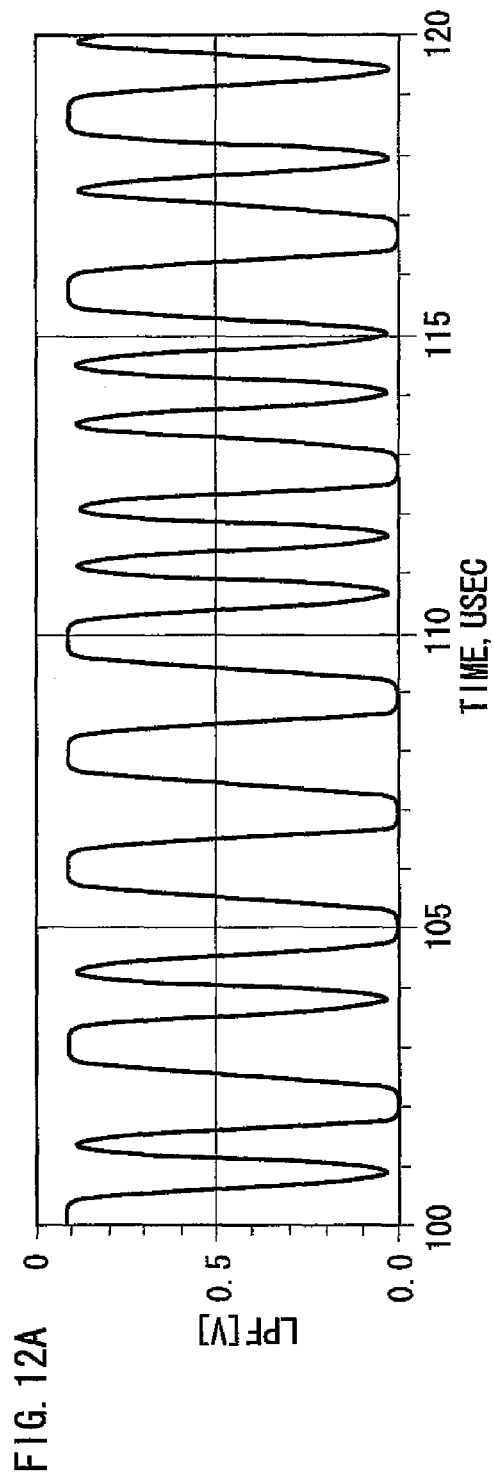
FIG. 12A is a graph showing a time waveform output from a band-limiting LPF of the second embodiment.
Figure 12B:
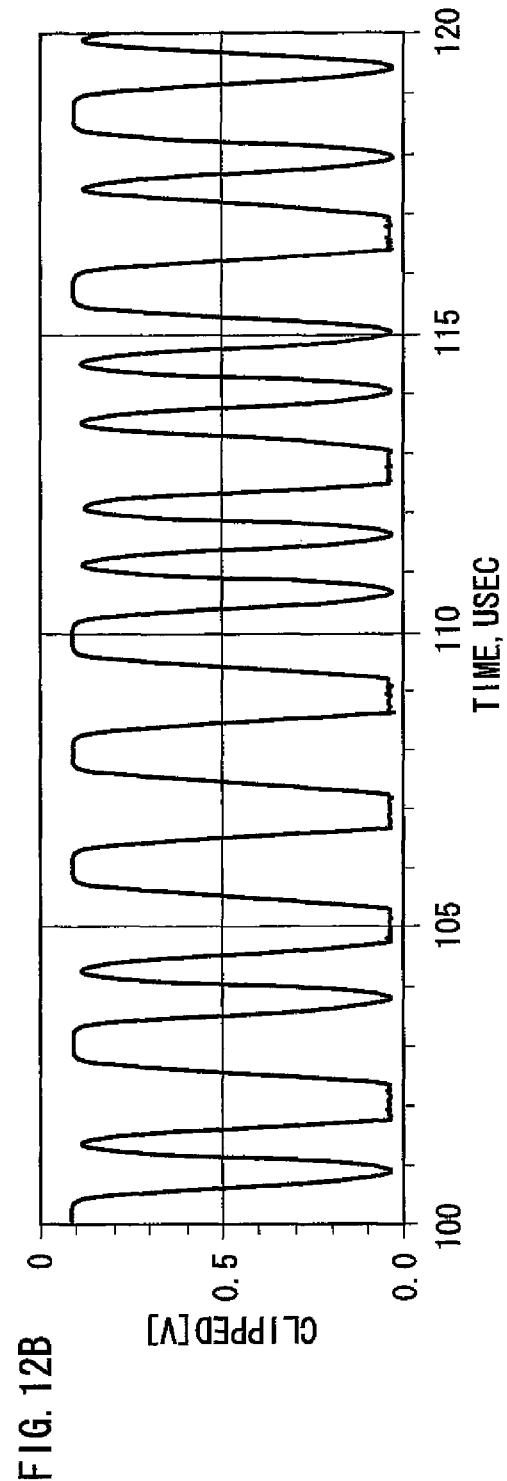
FIG. 12B is a graph showing a clipped waveform of the second embodiment.

The results are shown in FIG. 12A and FIG. 12B. Here, FIG. 12A shows the signals at the LPF terminal in FIG. 11, and FIG. 12B shows a clipped waveform which can be outputted from the CLIPPED terminal shown in FIG. 11. The output envelope when the carrier of the present embodiment is ASK-modulated with the Clipped waveform is shown in FIG. 7B. According to this embodiment, as seen from FIG. 7B, it is possible to remarkably reduce the difference between the On/Off ratios of the ASK-modulated waves. FIG. 13 shows an output spectrum. The adjacent wave leakage power of this case is 38 dB, which is as same as the value shown in FIG. 17. Here, the adjacent wave leakage power is not deteriorated even for the extremely small difference between the On/Off ratios of the ASK-modulated waves.

According to the present invention, as has been described above, it is possible, without introducing the deterioration of the adjacent wave leakage power, to realize a Manchester-encoded ASK modulator in which the difference between the On/Off ratio of the low envelope frequency components and the On/Off ratio of the high envelope frequency components is remarkably reduced, in order to generate easily receivable signals.

When the carrier frequency is high, the On/Off ratio of the ASK-modulated waves is easily deteriorated. In the present invention, however, the On/Off ratio of the ASK-modulated waves can also be improved by deepening the depth of ASK modulation in a mixer 89 in FIG. 8. The adjacent wave leakage power ratio to be inputted to the mixer 89 is not deteriorated so that the adjacent wave leakage power ratio is not seriously deteriorated even if the On/Off ratio of the ASK-modulated waves is improved.

What is claimed is:

1. An ASK modulator comprising:
   a Manchester encoder that generates Manchester-encoded signals by applying Manchester encoding to an input signal sequence;
   a waveform shaping unit that generates shaped signals from the Manchester-encoded signals, the shaped signals are band-limited encoded signals and minimum values of waveforms of the band-limited encoded signals are limited; and a modulating unit that modulates carrier waves based on the shaped signals,
wherein the waveform shaping unit comprises
  a band-limiting unit that limits frequency bands of the Manchester-encoded signals, and
  a signal-limiting unit that detects and limits the minimum values of the waveforms of the band-limited encoded signals generated by the band-limiting unit, and
wherein the signal limiting unit comprises
  a control signal generating unit that generates a control signal responsive to the Manchester-encoded signals,
  a minimum value detector that detects a value of the waveform of the band-limited encoded signals responsive to the control signal, and that generates a bottom signal indicative of the detected value of the waveform, and
  a clipper unit that limits the waveforms of the band-limited encoded signals to be greater than the detected value of the waveform responsive to the bottom signal, to provide the shaped signals.

* * * * *